(12) United States Patent
Xue et al.

(10) Patent No.: US 12,132,308 B2
(45) Date of Patent: Oct. 29, 2024

(54) ELECTROSTATIC PROTECTION CIRCUIT

(71) Applicant: CHANGXIN MEMORY TECHNOLOGIES, INC., Hefei (CN)

(72) Inventors: Zhan Xue, Hefei (CN); Qian Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 190 days.

(21) Appl. No.: 17/898,535

(22) Filed: Aug. 30, 2022

(65) Prior Publication Data

US 2023/0327430 A1 Oct. 12, 2023

Related U.S. Application Data

(63) Continuation of application No. PCT/CN2022/097574, filed on Jun. 8, 2022.

(30) Foreign Application Priority Data

Apr. 11, 2022 (CN) .......................... 202210374149.0

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC ............................. H02H 9/046; H02H 1/0007
USPC ........................................................... 361/56
See application file for complete search history.

(56) References Cited

U.S. PATENT DOCUMENTS

| | | | | |
|---|---|---|---|---|
| 5,956,219 | A * | 9/1999 | Maloney | H02H 9/046 361/111 |
| 6,643,109 | B1 * | 11/2003 | Li | H01L 27/0251 361/111 |
| 7,102,862 | B1 | 9/2006 | Lien | |
| 8,009,396 | B2 * | 8/2011 | Bernard | H02H 9/046 361/111 |
| 10,177,135 | B2 * | 1/2019 | Huang | H01L 27/0266 |
| 10,186,860 | B2 * | 1/2019 | Fifield | H01L 23/5228 |
| 10,897,131 | B2 * | 1/2021 | Liao | H01L 27/0285 |
| 11,088,541 | B2 * | 8/2021 | Huang | H01L 27/0285 |
| 11,848,554 | B2 * | 12/2023 | Hsu | H02H 9/046 |

(Continued)

FOREIGN PATENT DOCUMENTS

| | | |
|---|---|---|
| CN | 101566658 A | 10/2009 |
| CN | 105680433 A | 6/2016 |

(Continued)

*Primary Examiner* — Dharti H Patel
(74) *Attorney, Agent, or Firm* — Syncoda LLC; Feng Ma

(57) ABSTRACT

An electrostatic protection circuit includes: a monitoring circuit configured to generate a trigger signal in response to an electrostatic pulse being present on the power supply pad; a discharge transistor connected between the power supply pad and the ground pad and configured to be turned on under control of the trigger signal and discharge electrostatic discharging charges to the ground pad; and a delay circuit having an input terminal connected to an output terminal of the monitoring circuit, and an output terminal connected to a control terminal of the discharge transistor, where the delay circuit is configured to perform delay processing on the electrostatic protection circuit in a first state and turn off the discharge transistor in a second state.

15 Claims, 19 Drawing Sheets

(56) References Cited

U.S. PATENT DOCUMENTS

| | | | |
|---|---|---|---|
| 2008/0106834 A1* | 5/2008 | Hung | H02H 9/046 |
| | | | 361/56 |
| 2009/0267584 A1 | 10/2009 | Ker et al. | |
| 2014/0036398 A1* | 2/2014 | Kuznetsov | H02H 9/046 |
| | | | 257/E21.004 |
| 2014/0192445 A1* | 7/2014 | Ikeda | H02H 9/046 |
| | | | 361/56 |
| 2015/0162745 A1* | 6/2015 | Ikeda | H01L 27/0248 |
| | | | 361/56 |
| 2019/0006841 A1 | 1/2019 | Singh | |
| 2020/0083704 A1* | 3/2020 | Huang | H01L 27/0285 |
| 2021/0343702 A1* | 11/2021 | Xu | H01L 27/0288 |
| 2022/0320076 A1* | 10/2022 | Li | H02H 9/046 |
| 2023/0411383 A1* | 12/2023 | Xu | H01L 27/0285 |

FOREIGN PATENT DOCUMENTS

| | | | | |
|---|---|---|---|---|
| CN | 108767835 A | | 11/2018 | |
| CN | 110957713 A | | 4/2020 | |
| CN | 111193249 A | * | 6/2020 | ............ H02H 9/02 |
| CN | 112039040 A | | 12/2020 | |
| CN | 114121931 A | | 3/2022 | |
| WO | WO-2021190286 A1 | * | 9/2021 | ......... H01L 27/0266 |

\* cited by examiner

ELECTROSTATIC PROTECTION CIRCUIT

CROSS-REFERENCE TO RELATED APPLICATIONS

The application is a continuation of International Application No. PCT/CN2022/097574, filed on Jun. 8, 2022, which claims priority to Chinese Patent Application No. 202210374149.0, filed on Apr. 11, 2022. The disclosures of International Application No. PCT/CN2022/097574 and Chinese Patent Application No. 202210374149.0 are hereby incorporated by reference in their entireties.

BACKGROUND

Electro-Static Discharge (ESD) is an important reliability problem in integrated circuits. ESD refers to a discharging process formed due to transfer of charges accumulated on an electrified body when the electrified body contacts with an integrated circuit. ESD will cause damage to the integrated circuit.

With the rapid development of integrated circuit technology in recent years, the line width of the Metal-Oxide-Semiconductor Field Effect Transistor (MOSFET) is getting narrower and narrower, the junction depth is getting shallower and shallower, and the thickness of gate oxide layer is getting thinner and thinner, which all accelerate the demand for ESD in circuit design. It is far from enough to rely solely on ESD protection circuit at input port and output port, it is also necessary to add ESD protection circuit between power supply pad and ground pad, so as to discharge current more quickly and ensure ESD performance of the whole chip. However, there are some problems, such as a high turn-on voltage and an insufficient discharging time, in the ESD protection circuit in related art. The problems lead to poor discharging of the voltage on the power supply pad, resulting in phenomena that the device is burned out and the resistance is increased. Therefore, a new ESD protection circuit is required.

SUMMARY

The present disclosure relates to, but is not limited to, an electrostatic protection circuit.

The present disclosure provides an electrostatic protection circuit that can reduce the turn-on voltage and prolong the discharge time.

An embodiment of the present disclosure provides an electrostatic protection circuit disposed between a power supply pad and a ground pad, the electrostatic protection circuit includes: a monitoring circuit configured to generate a trigger signal in response to an electrostatic pulse being present on the power supply pad; a discharge transistor connected between the power supply pad and the ground pad and configured to be turned on under control of the trigger signal and discharge electrostatic discharging charges to the ground pad; and a delay circuit having an input terminal connected to an output terminal of the monitoring circuit, and an output terminal connected to a control terminal of the discharge transistor, the delay circuit is configured to perform delay processing on the electrostatic protection circuit in a first state and turn off the discharge transistor in a second state.

DETAILED DESCRIPTION

Figure 1:
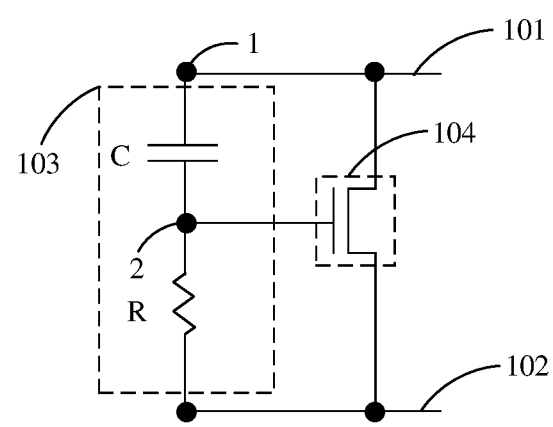
FIG. 1 is a schematic structural diagram of an electrostatic protection circuit according to an embodiment of the present disclosure.

The technical scheme in the embodiment of the present disclosure will be clearly and completely described below in conjunction with the drawings in the embodiment of the present disclosure. It can be appreciated that the specific embodiments described herein are intended only to explain the relevant disclosure and not to limit the present disclosure. In addition it should be noted that for convenience of description, only portions related to the relevant disclosure are shown in the drawings.

Unless otherwise defined, all technical and scientific terms used herein have the same meaning as commonly understood by those skilled in the technical field of the present disclosure. The terms used herein is only for the purpose of describing the present disclosure, and is not intended to limit the present disclosure.

In the following description, "some embodiments" are referred to, which describe a subset of all possible embodiments, but it is understood that "some embodiments" may be the same subset or different subsets of all possible embodiments, and may be combined with each other without conflict.

It should be noted that, the terms "first\second\third" in the present disclosure are used for distinguishing similar objects and not necessarily for describing a specific sequence or sequential order. It is to be understood that the terms "first\second\third" may be interchangeable under an appropriate circumstance, so that the embodiments of the present disclosure described herein are, for example, capable of being implemented in a sequence other than those illustrated or described herein.

FIG. 1 is a schematic structural diagram of an electrostatic protection circuit. As shown in FIG. 1, the circuit is disposed between a power supply pad 101 and a ground pad 102, and the circuit includes a resistance-capacitance network (RC network for short) 103 and a discharge transistor 104. The RC network 103 includes a resistor R and a capacitor C connected in series. A first end of the capacitor C and a source of the discharge transistor 104 are respectively connected to a power supply pad 101, a second end of the resistor R and a drain of the discharge transistor 104 are respectively connected to a ground pad 102, and an output terminal of the RC network 103 is connected to a control terminal of the discharge transistor 104. When an ESD event occurs, the voltage on the power supply pad 101 rises rapidly, and the RC network 103 responds and outputs a high-level signal to control the discharge transistor 104 to be turned on for discharging. However, because the rising time of the pulse on the power supply pad in ESD event is very short, the discharge transistor is turned off without sufficient discharging under the control of the output voltage of RC network, therefore the discharge time of the discharge transistor is insufficient and the turn-on voltage of the discharge transistor is high.

Figure 2:
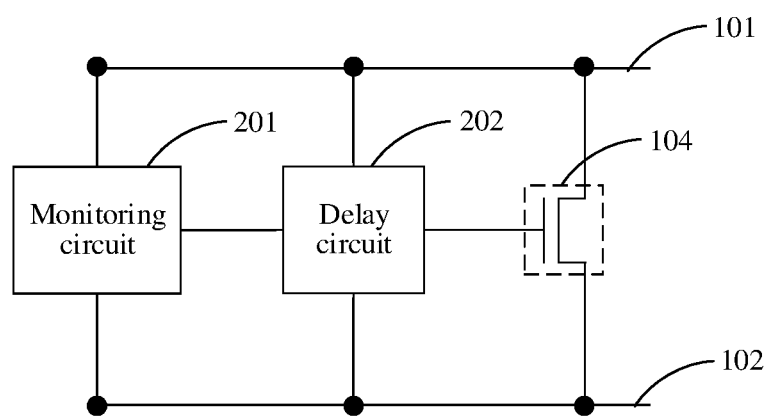
FIG. 2 is a schematic structural diagram of another electrostatic protection circuit according to an embodiment of the present disclosure.

Based on the above technical problems, the embodiment of the present disclosure provides an electrostatic protection circuit, as shown in FIG. 2, the electrostatic protection circuit is arranged between the power supply pad 101 and the ground pad 102, and the circuit includes a monitoring circuit 201, a discharge transistor 104 and a delay circuit 202.

The monitoring circuit 201 is configured to generate a trigger signal in response to an electrostatic pulse being present on the power supply pad 101.

The discharge transistor 104 is connected between the power supply pad 101 and the ground pad 102 and is configured to be turned on under control of the trigger signal and discharge electrostatic discharging charges to the ground pad 102.

The delay circuit 202 has an input terminal connected to an output terminal of the monitoring circuit 201, and an output terminal connected to a control terminal of the discharge transistor 104. The delay circuit is configured to perform delay processing on the electrostatic protection circuit in a first state and turn off the discharge transistor 104 in a second state.

Herein, the monitoring circuit can include a resistor and a capacitor connected in series. The time constant of the monitoring circuit can be adjusted, by changing the values of the resistance and the capacitance, to distinguish the normal pulse from the electrostatic pulse, so that a trigger signal can be generated in response to the electrostatic pulse being present on the power supply pad. Since the rising time of the pulse in the ESD event is usually less than 10 ns, the time constant of the monitoring circuit can be set to 10 ns so that the time constant can cover the width of the ESD pulse. In this way, in a case where the ESD event occurs, the output voltage of the monitoring circuit does not rise to a destructive voltage that changes the level signal type (i.e., a high-level signal and a low-level signal) of the output voltage, thereby implementing the distinction between the normal pulse and the electrostatic pulse. In some embodiments, the time constant of the monitoring circuit may also be greater than 10 ns, which is not limited in the embodiments of the present disclosure.

In some embodiments, the time constant of the monitoring circuit may be set by setting the resistance or capacitance values of the resistor R and the capacitor C in the monitoring circuit. For example, if R=10 KOhms (KΩ) and C1=1 picofarad (pF), the time constant of the monitoring circuit is 10 ns; for another example, if R=5 KΩ and C1=3 pF, the time constant of the monitoring circuit is 15 ns.

Figure 3A:
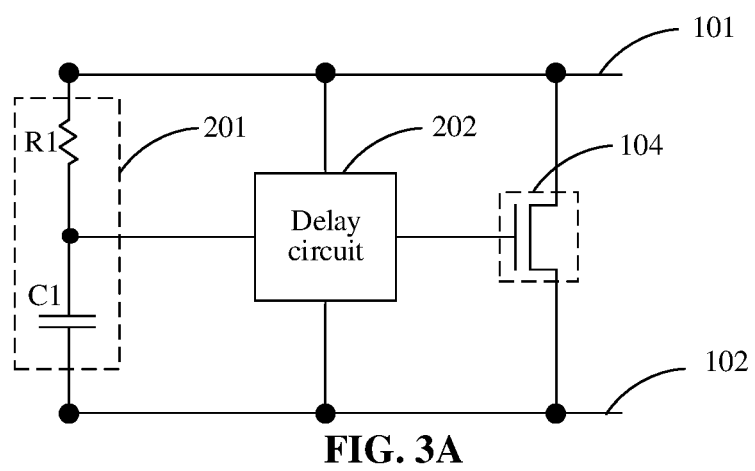
FIG. 3A and FIG. 3B are respectively schematic structural diagrams of another electrostatic protection circuit according to an embodiment of the present disclosure.
Figure 3B:
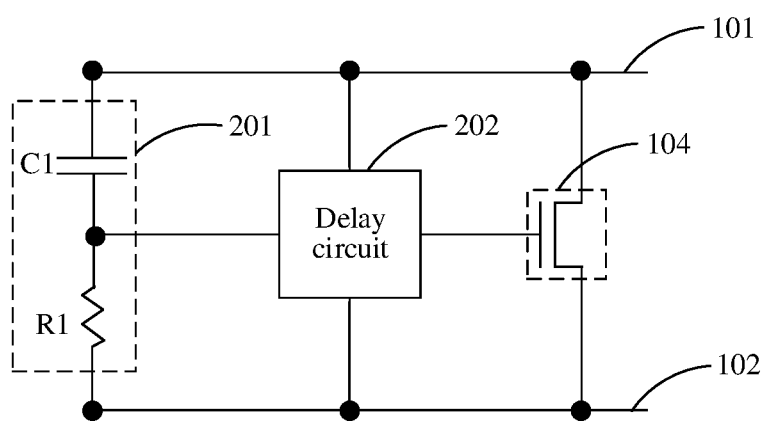

In some embodiments, as shown in FIG. 3A the monitoring circuit 201 may include a monitoring resistor R1 having a first end connected to the power supply pad 101 and a monitoring capacitor C1 having a first end connected to a second end of the monitoring resistor R1, and a second end connected to the ground pad 102. In this way, in response to an electrostatic pulse being present on the power supply pad, the output voltage of the monitoring circuit is a low-level signal; in response to a normal pulse being present on the power supply pad, the output voltage of the monitoring circuit is a high-level signal, and the trigger signal for the electrostatic pulse is the low-level signal. In other embodiments, as shown in FIG. 3B, the monitoring circuit 201 may also include a monitoring resistor R1 and a monitoring capacitor C1, but the first end of the monitoring capacitor C1 is connected to the power supply pad 101, the first end of the monitoring resistor R1 is connected to the second end of the monitoring capacitor C1, and the second end of the monitoring resistor R1 is connected to the ground pad 102. In this way, in response to an electrostatic pulse being present on the power supply pad, the output voltage of the monitoring circuit is a high-level signal; in response to a normal pulse being present on the power supply pad, the output voltage of the monitoring circuit is a low-level signal, and the trigger signal for the electrostatic pulse is the high-level signal.

In some embodiments, in order to speed up the discharge speed of the discharge transistor and reduce the turn-on voltage, the discharge transistor may have a relatively large size, for example, the width of the gate of the discharge transistor can be increased (e.g., between 500 microns and 1000 microns), so that a larger current flows when the discharge transistor is turned on. In this way, the electrostatic voltage on the power supply pad is discharged faster and the turn-on voltage of the electrostatic circuit is reduced.

In some embodiments, the first state refers to a state where the electrostatic discharge occurs, and the second state refers to a normal power-on state or normal power consumption state. The delay circuit can include at least one resistance-capacitance circuit, referred to as RC circuit (i.e., a circuit composed of the resistor and the capacitor). By adjusting the time constant of the at least one RC circuit, the delay processing is performed on the trigger signal in the first state.

In some embodiments, the delay circuit may further include at least one inverter. By controlling the number of inverters, in the first state, the signal inputted into the control terminal of the discharge transistor is a high level signal, and the discharge transistor is controlled to be turned on to discharge the electrostatic voltage; and in the second state, the signal inputted into the control terminal of the discharge transistor is a low level signal, and the discharge transistor is controlled to be turned off to maintain the voltage on the power supply pad.

In some embodiments, the delay processing for the electrostatic protection circuit in the first state may also be implemented by increasing the width of the gate of the Metal-Oxide-Semiconductor Field-Effect Transistor (MOSFET) (abbreviated as MOS) in the at least one inverter to increase the delay effect.

In some embodiments, the inverter may include a resistor-loaded inverter, an NMOS-loaded inverter, and a Complementary Metal Oxide Semiconductor (CMOS) inverter. CMOS inverter includes a NMOS transistor and a PMOS transistor working in a complementary mode.

In the embodiments of the present disclosure, in the first aspect, the distinction between normal pulses and electrostatic pulses is implemented by arranging a monitoring circuit in the circuit; in the second aspect, a delay circuit is arranged in the circuit, so that the delay processing of the electrostatic protection circuit in the electrostatic state is implemented, the discharge time is prolonged, the turn-on voltage is reduced, the discharge transistor is controlled to be turned off in the normal state to maintain the voltage on the power supply pad.

In some embodiments, the delay circuit may include a first delay unit. The first delay unit is configured to perform the delay processing on the trigger signal in the first state, a RC time constant for the delay processing is adjustable, an input terminal of the first delay unit is used as the input terminal of the delay circuit, and an output terminal of the first delay unit is coupled to the control terminal of the discharge transistor.

Herein, the first delay unit may include at least one RC circuit. The delay processing is performed on the trigger signal in the first state by adjusting the time constant of the at least one RC circuit. In some embodiments, the first delay unit may further include at least one inverter. By controlling the number of inverters, in the first state, the signal inputted to the control terminal of the discharge transistor is a high level signal, and the discharge transistor is controlled to be turned on to discharge the electrostatic voltage; and in the second state, the signal inputted to the control terminal of the discharge transistor is a low level signal, and the discharge transistor is controlled to be turned off to maintain the voltage on the power supply pad. In some embodiments, the delay processing for the electrostatic protection circuit in the first state may also be implemented by increasing the width of the gate of the MOS transistor in the at least one inverter to increase the delay effect.

In some embodiments, the R in the RC circuit may be a PMOS transistor, an NMOS transistor, or a resistor, and the type of R in the RC circuit is not limited in the embodiments of the disclosure. In some embodiments, the R in the RC circuit may be connected to the ground pad and the C to may be connected to the power supply pad; or R can also be connected to the power supply pad and C can be connected to the ground pad. The embodiments of the present disclosure do not limit the positions of the R and the C between the power supply pad and the ground pad in the RC circuit, and the positions can be designed according to the circuit requirements.

Figure 4A:
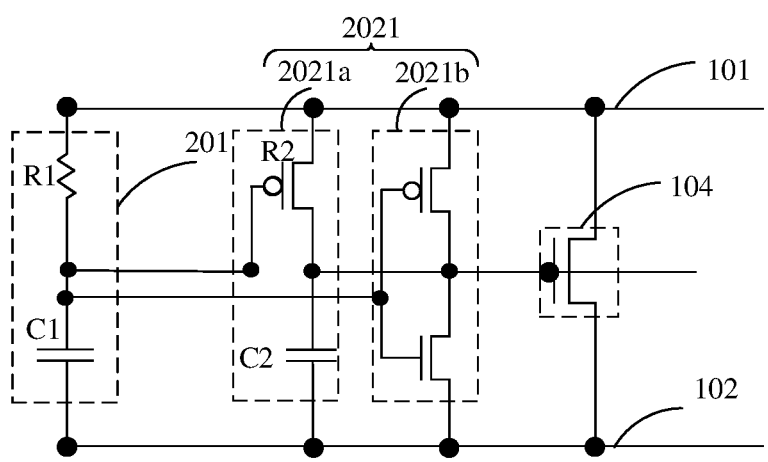
FIG. 4A and FIG. 4B are respectively schematic structural diagrams of the another electrostatic protection circuit according to an embodiment of the present disclosure.
Figure 4B:
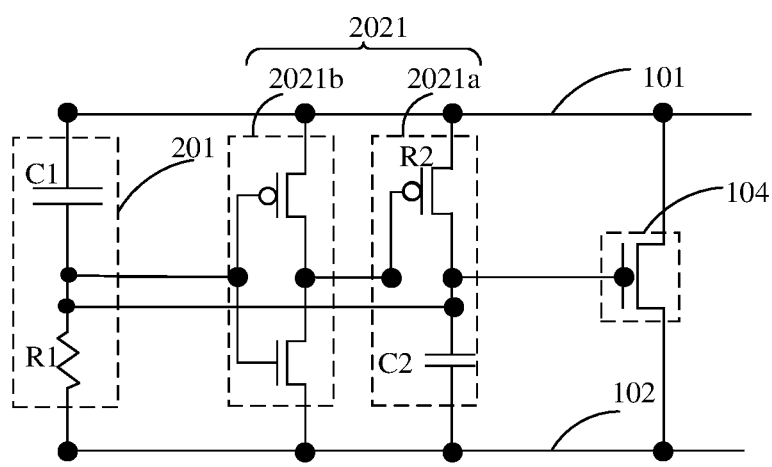

FIG. 4A and FIG. 4B are schematic structural diagrams of the first delay unit 2021 including at least one RC circuit. As shown in FIG. 4A, the monitoring circuit 201 includes a monitoring resistor R1 and a monitoring capacitor C1. The first end of the monitoring resistor R1 is connected to the power supply pad 101. The monitoring capacitor C1 has the first end connected to the second end of the monitoring resistor R1, and a second end connected to the ground pad 102. The output terminal of the monitoring circuit 201 is respectively connected to the input terminal of the RC circuit 2021a and the input terminal of the inverter 2021b. The control terminal of the discharge transistor 104 is respectively connected to the output terminal of the RC circuit 2021a and the output terminal of the inverter 2021b. In this way, in the electrostatic state, the monitoring circuit outputs a low-level signal, and after the low-level signal is inputted into the RC circuit, the PMOS transistor in the RC circuit is turned on, and the output of the RC circuit is a high-level signal, and after the high-level signal is inputted into the discharge transistor, the discharge transistor is controlled to be turned on and discharges the electrostatic voltage. In the normal state, the monitoring circuit outputs a high-level signal passed through the inverter, the inverter outputs a low-level signal inputted into the discharge transistor, and the discharge transistor is controlled to be turned off to maintain the voltage on the power supply pad.

As also shown in FIG. 4B, the monitoring circuit 201 also includes a monitoring resistor R1 and a monitoring capacitor C1, but the first end of the monitoring capacitor C1 is connected to the power supply pad 101; and the first end of the monitoring resistor R1 is connected to the second end of the monitoring capacitor C1, the second end of the monitoring resistor R1 is connected to the ground pad 102. The output terminal of the monitoring circuit 201 is respectively connected to the input terminal of the inverter 2021b and the control terminal of the discharge transistor 104. The output terminal of the inverter 2021b is connected to the input terminal of the RC circuit 2021a, and the output terminal of the RC circuit 2021a is connected to the control terminal of the discharge transistor 104. In this way, in the electrostatic state, the monitoring circuit outputs a high-level signal passed through the inverter, the inverter outputs a low-level signal, so that the MOS transistor in the RC circuit is turned on, and the RC circuit outputs a high-level signal inputted into the discharge transistor, the discharge transistor is controlled to be turned on and discharges the electrostatic voltage. In the normal state, the monitoring circuit outputs a low-level signal inputted into the discharge transistor, and the discharge transistor is controlled to be turned off to maintain the voltage on the power supply pad.

In some embodiments, the first delay unit may include at least two RC circuits, which will be described below by taking, as an example, the first delay unit including two RC circuits (a first RC circuit and a second RC circuit, respectively, in order from left to right). For example, on the basis of FIG. 4A and FIG. 4B, an inverter is added to the output terminal of the first RC circuit (i.e., RC circuit 2021a in FIG. 4A and FIG. 4B), and then a second RC circuit identical to the first RC circuit is connected to the inverter. In this way, the performance of the first delay unit including two RC circuits can be identical to the performance of the circuits in FIG. 4A and FIG. 4B. For another example, a second RC circuit different from the first RC circuit is connected at the output terminal of the first RC circuit. Exemplarily, the first RC circuit includes a PMOS transistor and a capacitor, the PMOS transistor is connected to the power supply pad and the capacitor is connected to the ground pad, then the second RC circuit may include an NMOS transistor and a capacitor, the NMOS transistor is connected to the ground pad and the capacitor is connected to the power supply pad. In this way, the performance of the first delay unit including two RC circuits can be identical to the performance of the circuits in FIG. 4A and FIG. 4B.

In some embodiments, an even number of inverters may also be added before or after each RC circuit, such that the input voltages of each RC circuit and the discharge transistor remain unchanged. In this way, the performance of the first delay unit including two RC circuits can be identical to the performance of the circuits in FIG. 4A and FIG. 4B.

Figure 4C:
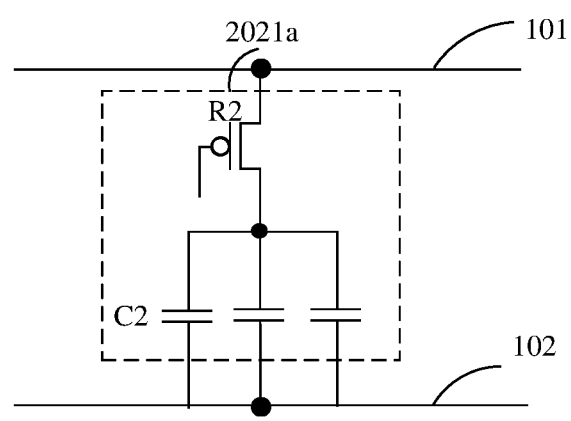
FIG. 4C is a schematic structural diagram of an RC circuit according to an the embodiment of the present disclosure.

In some embodiments, as shown in FIG. 4C, the RC circuit 2021a may include multiple capacitors (e.g., three capacitors in the figure) connected in parallel. The time constant of the RC circuit is adjusted through the capacitors connected in parallel, the capacitance value of each capacitor may be identical to or different from each other, which is not limited in the embodiments of the present disclosure.

In the embodiment of the present disclosure, the delay circuit includes the first delay unit configured to perform the delay processing on the trigger signal in the first state, and the RC time constant for the delay processing is adjustable.

In this way, in the electrostatic state, the discharge time is prolonged and the turn-on voltage is reduced.

Figure 5A:
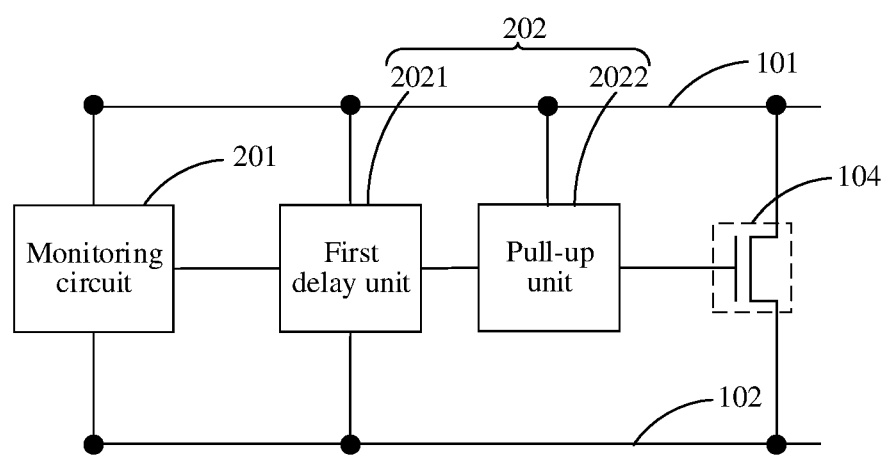
FIG. 5A to FIG. 5D are respectively schematic structural diagrams of another electrostatic protection circuit according to an embodiment of the present disclosure.

In some embodiments, as shown in FIG. 5A, the delay circuit 202 further includes a pull-up unit 2022 having one end connected to the power supply pad 101, and the other end connected to the control terminal of the discharge transistor 104. The pull-up unit 2022 is configured to turn on, in the first state, the discharge transistor 104 for discharging electrostatic charges. In some embodiments, the input terminal of the pull-up unit 2022 may be connected to the output terminal of the first delay unit 2021 for receiving an output signal of the first delay unit, which is used to control, in the first state, the discharge transistor to be turned on.

In some embodiments, The pull-up unit may include a switch having one end connected to the power supply pad, a second end connected to the control terminal of the discharge transistor, and a control terminal of connected to the output terminal of the first delay unit. The switch is configured to receive the output signal from the first delay unit and control the discharge transistor to be turned on in the first state. Since the first end of the switch is connected to the power supply pad, the voltage inputted into the control terminal of the discharge transistor is close to the voltage of the power supply pad, so that the discharge transistor is turned on to a greater extent, and the pull-up function is implemented.

In a case where the switch is a transistor, the voltage at the control terminal of the discharge transistor can also be increased by adjusting the width-to-length ratio of a gate of the transistor, to enable the discharge transistor to be turned on to a greater extent. The larger the width-to-length ratio of the gate of the transistor, the larger the current flowing through the transistor in the first state, so that the voltage inputted into the control terminal of the discharge transistor is larger.

In the embodiment of the present disclosure, the turn-on extent of the discharge transistor is improved by making the delay circuit include a pull-up unit, thereby increasing the discharge capacity of the discharge transistor and reducing the turn-on voltage.

Figure 5B:
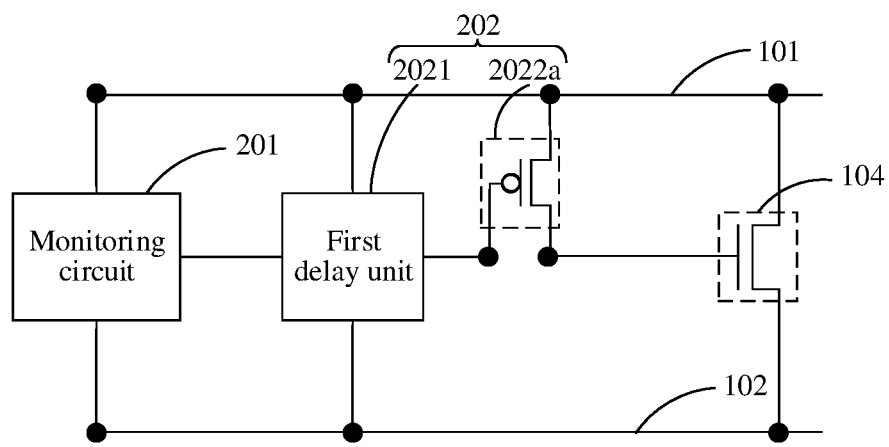

In some embodiments, as shown in FIG. 5B, the pull-up unit includes at least a first transistor 2022a having a control terminal connected to the output terminal of the first delay unit 2021, a second terminal connected to the power supply pad 101, and a third terminal serving as the output terminal of the pull-up unit and connected to the control terminal of the discharge transistor 104. The first transistor 2022a is configured to turn on, in the first state, the discharge transistor 104 for discharging the electrostatic charges.

Herein, the first transistor may be a first PMOS transistor. Since the second end of the first transistor is connected to the power supply pad, the voltage inputted into the control terminal of the discharge transistor is close to the voltage of the power supply pad, and the voltage at the control terminal of the discharge transistor can be further increased by increasing the width-to-length ratio of the gate of the transistor, so that the discharge transistor is turned on to a greater extent, thereby improving the discharge capability of the discharge transistor and reducing the turn-on voltage.

Figure 5C:
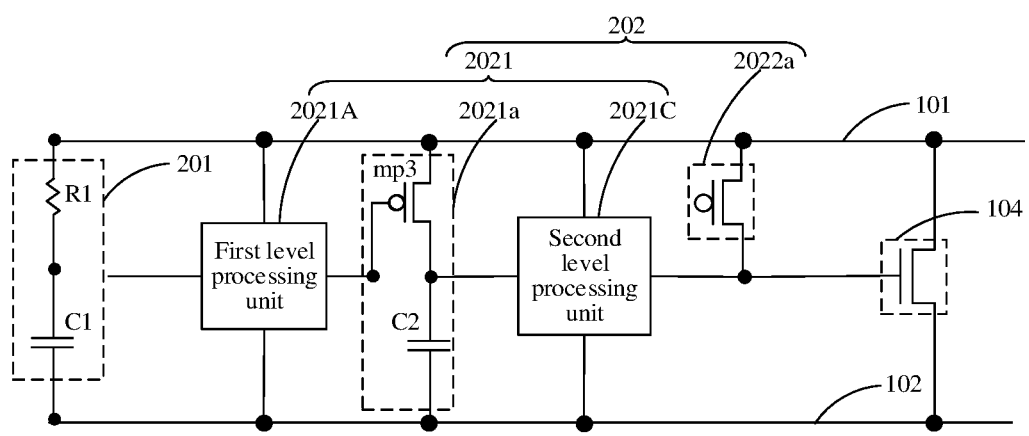

In some embodiments, as shown in FIG. 5C, the first delay unit 2021 may include an RC circuit 2021a, a first level processing unit 2021A, a second level processing unit 2021C.

The first level processing unit 2021A is configured to perform a first level processing on the output voltage of the monitoring circuit 201 to obtain a first voltage in phase with the output voltage of the monitoring circuit 201.

The RC circuit 2021a is configured to perform first delay processing on the output voltage subjected to the first level processing.

The second level processing unit 2021C is configured to perform a second level processing on the output voltage subjected to the first delay processing to obtain a second voltage inverted with respect to the output voltage subjected to the first delay processing.

Herein, the first voltage is an output voltage of the first level processing unit, and the second voltage is an output voltage of the second level processing unit.

In some embodiments as shown in FIG. 5C, the RC circuit 2021a includes a second transistor mp3 and a first capacitor C2. The second transistor mp3 is a second PMOS transistor.

The second PMOS transistor mp3 has a control terminal serving as an input terminal of the RC circuit 2021a, a second end connected to the power supply pad 101, and a third end serving as the output terminal of the RC circuit 2021a and respectively connected to the first end of the first capacitor C2 and an input terminal of the second level processing unit 2021C. A second end of the first capacitor C2 is connected to the ground pad 102.

In some embodiments, the time constant of the RC circuit may be adjusted by adjusting the values of the resistance and the capacitance, so as to implement the first delay processing on the output voltage subjected to the first level processing. For example, the time constant of the RC circuit may be set to have a value of 10 milliseconds (ms), and the time constant of the RC circuit is not limited in the embodiments of the present disclosure.

In some embodiments, since the monitoring circuit 201 includes a monitoring resistor R1 and a monitoring capacitor C1, the first end of the monitoring resistor R1 is connected to the power supply pad 101, the first end of the monitoring capacitor C1 is connected to the second end of the monitoring resistor R1, and the second end of the monitoring capacitor C1 is connected to the ground pad 102, then in the electrostatic discharge state, the output voltage of the monitoring circuit 201 is at a low level, In order to enable the second transistor mp3 in the RC circuit to be turned on in the electrostatic discharge state and has a function of a time delay, the voltage inputted into the control terminal of the second transistor mp3 needs to be at a low level, therefore, it is necessary for the first level processing unit to perform the first level processing on the output voltage of the monitoring circuit to enable the first voltage to be in phase with the output voltage of the monitoring circuit. In some embodiments, the first level processing unit may include an inverter, and inversion action of the inverter causes the first voltage to be in phase with the output voltage of the monitoring circuit. For example, if the output voltage of the monitoring circuit is at a high level, the first level processing unit may include an even number of inverters, and after the high level is inverted by the even number of inverters, the output voltage of the first level processing unit is still at a high level.

In some embodiments, as shown in FIG. 5C, the pull-up unit includes at least the first transistor 2022a, the first transistor 2022a may be a first PMOS transistor, in order to enable the first PMOS transistor to be turned on in an electrostatic discharge state and has the pull-up function, the voltage inputted into the control terminal of the first PMOS transistor needs to be at a low level, while the output voltage of the RC circuit needs to be at a high level. Therefore, it is necessary for the second level processing unit to perform the second level processing on the output voltage of the RC circuit to enable the second voltage to be inverted with respect to the output voltage of the RC circuit. In some embodiments, the second level processing unit may also include an inverter, and inversion action of the inverter causes the second voltage to be inverted with respect to the output voltage subjected to the first delay processing (i.e., the output voltage of the RC circuit). For example, if the output voltage subjected to the first delay processing is at a low level, the second level processing unit may include an odd number of inverters, and after the low level is inverted by the odd number of inverters, the output voltage of the second level processing unit is at a high level inverted with respect to the output voltage subjected to the first delay processing.

In some embodiments, the delay processing performed by the delay circuit includes at least one of: second delay processing performed by the first level processing unit on the output voltage of the monitoring circuit; or third delay processing performed by the second level processing unit on the output voltage subjected to the first delay processing.

Herein, since each of the first level processing unit and the second level processing unit may include an inverter, it is possible to adjust the width-to-length ratio of the gate of transistor in the inverter in at least one of the first level processing unit and the second level processing unit to improve the delay effect of the delay circuit and prolong the discharge time. The smaller the width-to-length ratio of the gate of the transistor gate in the inverter, the better the delay effect of the inverter.

For example, the width-to-length ratio of the gate of the transistor in the inverter in the first level processing unit can be adjusted to implement the second delay processing on the output voltage of the monitoring circuit. The width-to-length ratio of the gate of the transistor in the inverter in the second level processing unit can also be adjusted to implement the third delay processing on the output voltage of the first delay processing. The width-to-length ratios of the gates of the transistors in the inverters in both the first level processing unit and the second level processing unit can be respectively adjusted to respectively implement the second delay processing on the output voltage of the monitoring circuit and the third delay processing on the output voltage subjected to the first delay processing.

In the embodiment of the present disclosure, since the first delay unit includes the RC circuit, the first level processing unit and the second level processing unit, and each of the first level processing unit and the second level processing unit includes an inverter, so that the delay processing on the electrostatic discharge voltage can be implemented by adjusting at least one of the RC circuit, the first level processing unit and the second level processing unit, so that the adjustability of the whole circuit is improved.

Figure 5D:
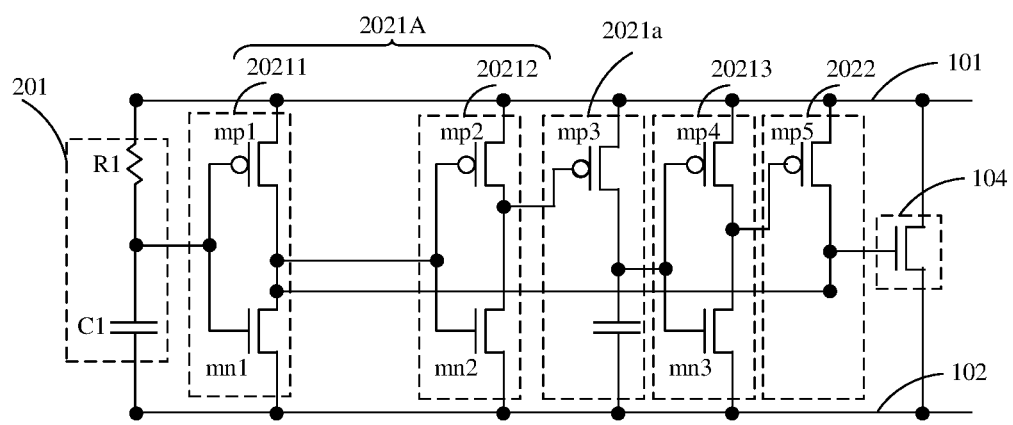

In some embodiments, as shown in FIG. 5D, the first level processing unit 2021A includes a first inverter 20211 and a second inverter 20212 sequentially connected to the monitoring circuit 201, the second level processing unit includes a third inverter 20213.

The output terminal of the monitoring circuit 201 is connected to an input terminal of the first inverter 20211, an output terminal of the first inverter 20211 is connected to the input terminal of the second inverter 20212, and an output terminal of the second inverter 20212 is connected to an input terminal of the RC circuit 2021a.

An output terminal of the RC circuit 2021a is connected to an input terminal of the third inverter 20213, and an output terminal of the third inverter 20213 is connected to an input terminal of the pull-up unit 2022.

Herein, since the first level processing unit includes the first inverter and the second inverter sequentially connected to the monitoring circuit, and the number of the inverters is even, so that a first voltage in phase with the output voltage of the monitoring circuit can be obtained after the first level processing is performed on the output voltage of the monitoring circuit.

Similarly, since the second level processing unit includes an odd number of third inverters connected to the RC circuit, after the output voltage of the RC circuit is subjected to the second level processing, a second voltage inverted with respected to the output voltage of the RC circuit can be obtained.

Figure 6A:
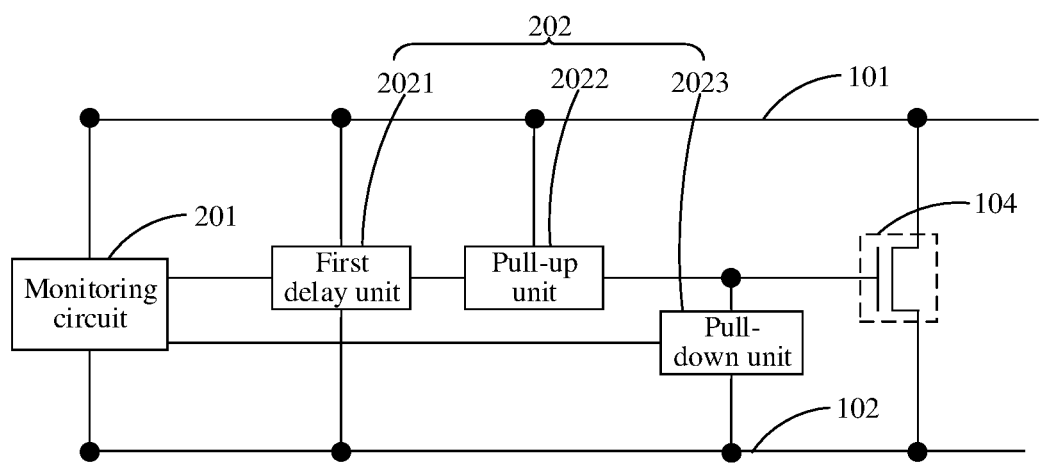
FIG. 6A to FIG. 6E are respectively schematic structural diagrams of another electrostatic protection circuit according to an embodiment of the present disclosure.

In some embodiments, as shown in FIG. 6A, the delay circuit 202 further includes a pull-down unit 2023 having an input terminal serving as an input terminal of the delay circuit 202, and an output terminal connected to the control terminal of the discharge transistor 104, and the pull-down unit 2023 is configured to turn off the discharge transistor in the second state.

Herein, the pull-down unit may include a switch having one end connected to the ground pad 102, a second end connected to the control terminal of the discharge transistor 104, and a control terminal connected to the output terminal of the monitoring circuit. The switch is configured to receive the output signal of the monitoring circuit in the second state to control the discharge transistor to be turned off. Since the first end of the switch is connected to the ground pad, the value of the voltage inputted into the control terminal of the discharge transistor is close to 0, in this way, the turn-off extent of the discharge transistor can be increased and thus the leakage current is reduced.

In a case where the switch is a transistor, it is possible to reduce the voltage at the control terminal of the discharge transistor by adjusting the width-to-length ratio of a gate of the transistor, so that the turn-off extent of the discharge transistor is greater. The larger the width-to-length ratio of the gate of the transistor, the smaller the divided voltage of the transistor in the second state, so that the voltage inputted into the control terminal of the discharge transistor is smaller.

In the embodiment of the present disclosure, by making the delay circuit include a pull-down unit, the turn-off extent of the discharge transistor is improved, thereby reducing the leakage current.

Figure 6B:
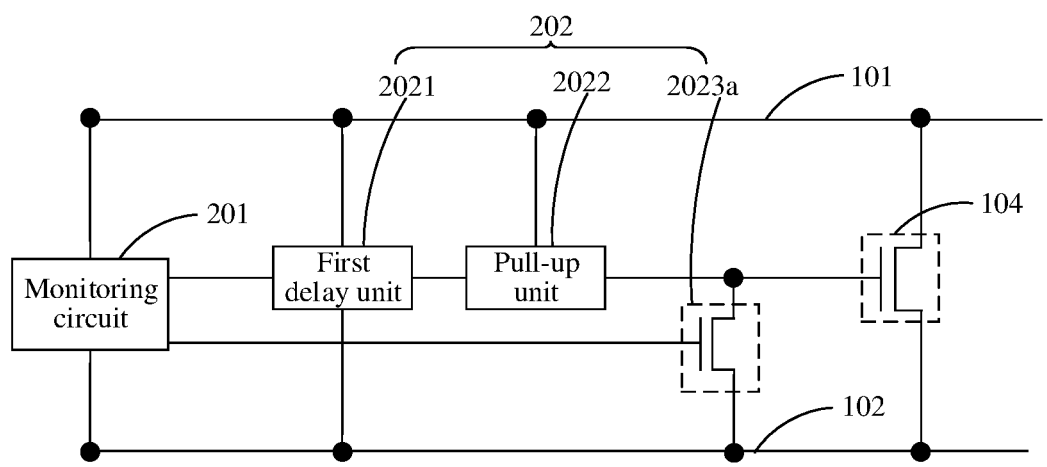

In some embodiments, As shown in FIG. 6B, the pull-down unit includes a third transistor 2023a having a control terminal serving as the input terminal of the delay circuit 202, a second end connected to the ground pad 102, and a third end connected to the control terminal of the discharge transistor 104. The third transistor 2023a is configured to turn off the discharge transistor 104 in the second state.

In some embodiments, the third transistor is a first NMOS transistor.

In the second state, in a case where the output voltage of the monitoring circuit is at a high level, the first NMOS transistor is turned on, since the first NMOS transistor is connected to the ground pad, the output voltage of the first NMOS transistor is at low level and close to 0. Furthermore, the voltage at the control terminal of the discharge transistor can be further reduced by increasing the width-to-length ratio of the gate of the first NMOS transistor, so that the turn-off extent of the discharge transistor is greater, in this way, the discharge transistor is controlled to be turned off and the leakage current is reduced.

Figure 6C:
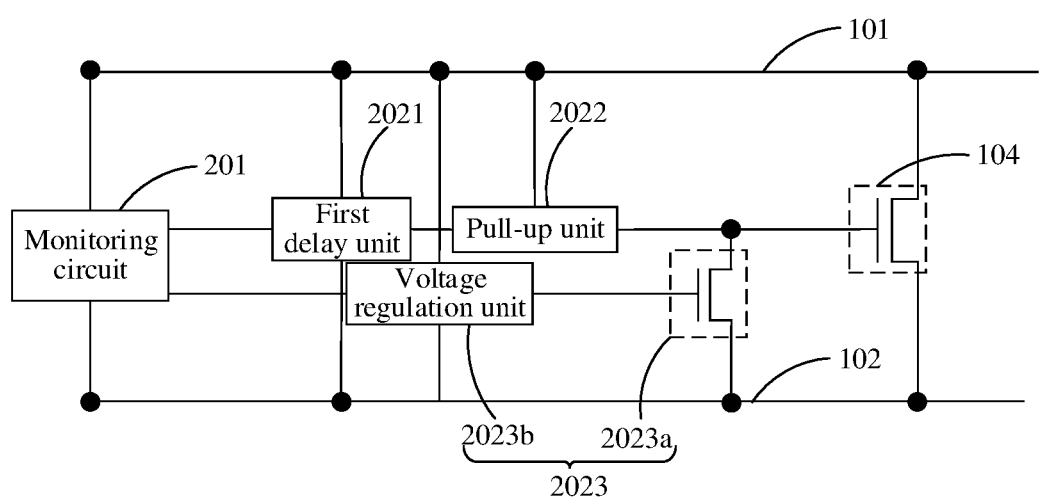

In some embodiments, in order to make the voltage at the control terminal of the third transistor in the pull-down unit more stable, as shown in FIG. 6C, the pull-down unit 2023 further includes a voltage regulation unit 2023*b* configured to regulate a voltage on the power supply pad 101. An input terminal of the voltage regulation unit 2023*b* is connected to the output terminal of the monitoring circuit 201, and an output terminal of the voltage regulation unit 2023*b* is connected to the control terminal of the third transistor 2023*a*.

Herein, the voltage inputted into the control terminal of the third transistor can be stored through a capacitor, so that the value of the voltage at the control terminal of the third transistor is stably close to 0, thereby implementing the voltage regulation function for the voltage on the power supply pad. In practical implementations, the capacitor and the transistor can be connected in series as a voltage regulation unit, the first end of the transistor is connected to a power supply pad, the second end of the transistor is connected to the first end of the capacitor, the second end of the capacitor is connected to a ground pad, and the capacitor is connected in parallel to the third transistor. Thus, in response to the transistor being turned on, the capacitor can be charged by the voltage on the power supply pad, therefore, the control terminal of the third transistor can be charged by the storage function of the capacitor, the regulation of the voltage at the control terminal of the third transistor can be implemented, and then the voltage regulation function for the voltage on the power supply pad can be implemented.

Figure 6D:
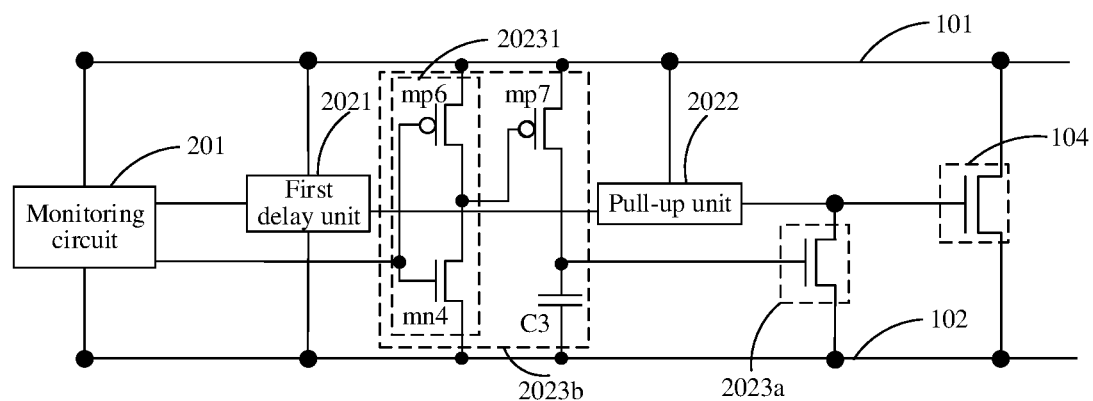

In some embodiments as shown in FIG. 6D, the voltage regulation unit may include a fourth inverter 20231, a fourth transistor mp7 and a second capacitor C3. The fourth transistor mp7 is a third PMOS transistor.

An input terminal of the fourth inverter 20231 is connected to the output terminal of the monitoring circuit 201, the control terminal of the third PMOS transistor mp7 is connected to an output terminal of the fourth inverter 20231, a second end of the third PMOS transistor mp7 is connected to the power supply pad 101, a third end of the third PMOS transistor mp7 is connected to a first end of the second capacitor C3 and the control terminal of the third transistor 2023*a*, respectively. A second end of the second capacitor C3 is connected to the ground pad 102.

In some embodiments since the monitoring circuit 201 includes a monitoring resistor R1 having a first end connected to the power supply pad 101; and a monitoring capacitor C1 having a first end connected to a second end of the monitoring resistor R1 and a second end connected to the ground pad 102, in the normal state, the output voltage of the monitoring circuit 201 is at a high level, in order to turn on the third PMOS transistor, the fourth inverter may be connected behind the monitoring circuit, and then, the output voltage from the fourth inverter is inputted into the control terminal of the third PMOS transistor, so that the third PMOS transistor is turned on in the normal state, and since the third PMOS transistor is connected in series to the second capacitor, the second capacitor can be charged, and then voltage regulation function for the voltage on the power supply pad can be implemented by using the second capacitor.

Figure 6E:
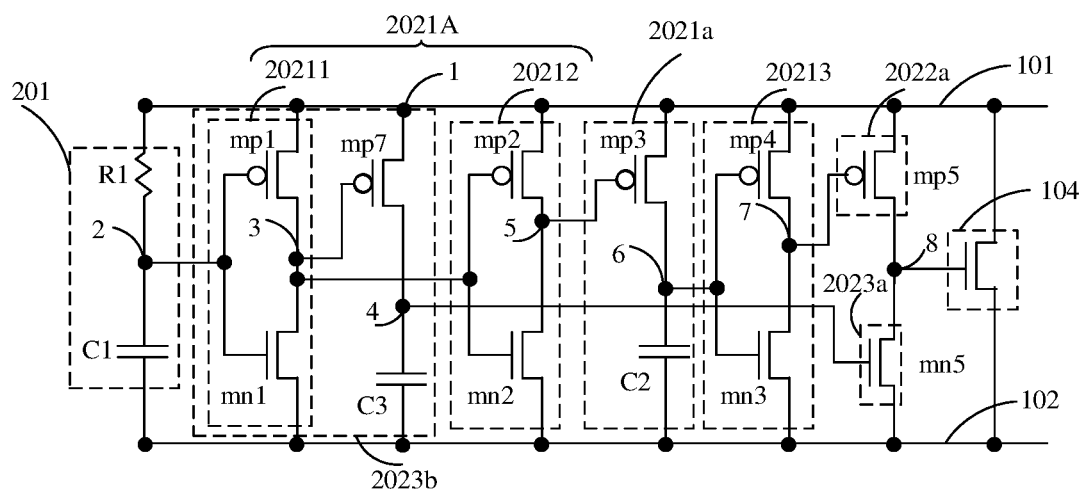

In some embodiments, as shown in FIG. 6E, the fourth inverter and the first inverter may be the same one inverter, i.e., the voltage regulation unit 2023*b* includes the first inverter 20211, the fourth transistor mp7 and the second capacitor C3. The output terminal of the monitoring circuit 201 is connected to the input terminal of the first inverter 20211, and the output terminal of the first inverter 20211 is respectively connected to the control terminal of the fourth transistor mp7 and the input terminal of the second inverter 20212. In some embodiments, the pull-up unit and the pull-down unit may also be connected with each other, and as shown in FIG. 6E, the third end of the first transistor in the pull-up unit may also be connected to the third end of the third transistor in the pull-down unit, to implement the connection of the pull-up unit and the pull-down unit.

In a normal power-on state, the voltage on the power supply pad rises from 0 volts (V) to an operating voltage (e.g., 1.8 V) over a long period of time (that usually may be a time from 1 microsecond (µs) to 1 ms), since the power-on speed is slow, the monitoring circuit 201 does not generate a response, the voltage of the position 2 is at a high level, and the transistor mn1 is turned on. Since the source of the transistor mn1 is grounded 102, the voltage of the position 3 is at a low level, and the transistor mp7 is turned on. Since the source of the transistor mp7 is connected to the power supply pad, the voltage of the position 4 is at a high level. In some embodiments, the current flowing through the mp7 may be increased by setting the width-to-length ratio (for example, the width-to-length ratio is increased) of the gate of the transistor mp7, thereby making the voltage at the position 4 closer to the voltage on the power supply pad. When the voltage at the position 4 is inputted into the NMOS transistor mn5 in the pull-down unit, the turn-on extent of the transistor mn5 is increased and the level at the position 8 is lowered. Since the source of the transistor mn5 is grounded, the voltage of the position 8 is at a low level and the discharge transistor 104 is turned off. In some embodiments, the resistance of the transistor mn5 can be reduced by setting the width-to-length ratio of the gate of the transistor mn5, to further reduce the voltage level of the position 8, so that the voltage level of the position 8 is closer to 0, and the leakage current of the discharge transistor 104 may be reduced.

In the normal power consumption state, the monitoring circuit 201 also does not generate a response, and the circuit flow direction is identical to that in the normal power-on state, which can be referred to above.

In the electrostatic discharge state, since power-on speed of the voltage on the power supply pad is quick, the monitoring circuit 201 generates a response, the voltage of the position 2 is at a low level, and the transistor mp1 is turned on. Since the source of the transistor mp1 is connected to the power supply pad 101, the voltage of the position 3 is at a high level, and the transistor mn2 is turned on. Since the source of the transistor mn2 is grounded, the voltage of the position 5 is at a low level, and the transistor mp3 is turned on. Since the source of the transistor mp3 is connected to the power supply pad 101, the voltage of the position 6 at a high level, and the transistor mn3 is turned on. Since the source of the transistor mn3 is grounded 102, the voltage of the position 7 is at a low level, and the transistor mp5 is turned on. Since the source of the transistor mp5 is connected to the power supply pad 101, the voltage of the position 8 is at a high level, and the discharge transistor 104 is turned on to discharge the ESD current. In some embodiments, since the source of the transistor mp5 is connected to the power supply pad 101, the resistance of the mp5 can be reduced by setting the width-to-length ratio of the mp5 so that the level of the position 8 is closer to the voltage on the power supply pad 101, therefore, the turn-on extent of the discharge transistor 104 increased and the discharge speed of the discharge transistor 104 is accelerated. In some embodiments, the resistance of the discharge transistor 104 can be reduced by setting the width-to-length ratio of the gate of the discharge transistor 104, to further accelerate the discharge speed of the discharge transistor 104.

Figure 7A:
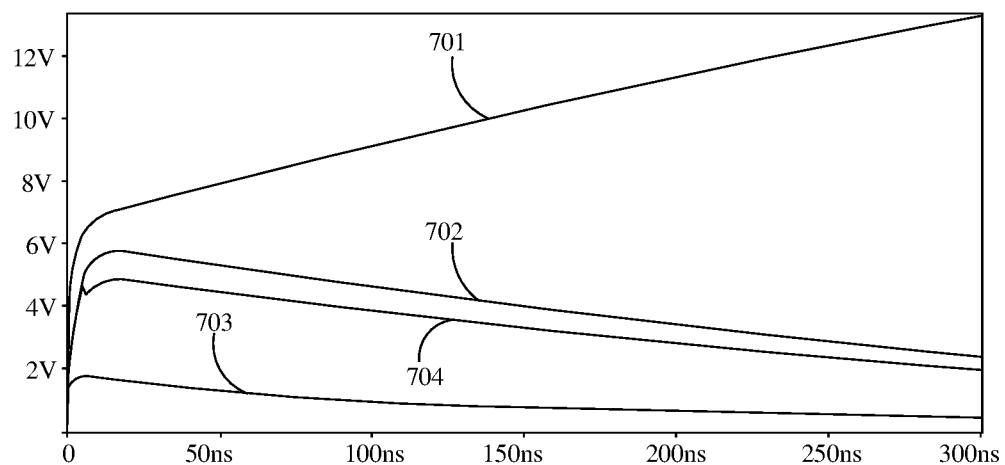
FIG. 7A is a diagram showing relationships of voltages at different positions respectively in the circuits shown in FIG. 1 and the circuit shown in FIG. 6E over time according to an embodiment of the present disclosure.

FIG. 7A is a diagram showing relationships of voltages at different positions respectively in the circuits shown in FIG. 1 and the circuit shown in FIG. 6E over time, where curve 703 is for a position of a node 2 in FIG. 1, curve 701 is for a position of a node 1 in FIG. 1, curve 702 is for a position of a node 1 in FIG. 6E, and curve 704 is for a position of a node 8 in FIG. 6E.

In response to an ESD event occurring in the circuit in FIG. 1, the capacitor C is just at the charging state, and the voltage of the node 2 is just at a high level. For the voltage at the node 1, since voltage of the node 2 is just at the high level, the discharge transistor 104 is turned on and the ESD current is discharged. During the continuous charging process of the capacitor C, the discharge transistor 104 is gradually turned off due to the continuous decrease of the voltage at the node 2, furthermore, due to the short rising time (less than 10 ns) of the ESD current, the discharge time of the discharge transistor 104 is insufficient, so that the voltage at the node 1 not be fully discharged and gradually rise.

In response to an ESD event occurring in the circuit in FIG. 6E, since the circuit in FIG. 6E can implement an increase in discharge time, so that the voltage at node 1 can be consistent with the voltage at node 8 in FIG. 6E, the discharge transistor continuously discharges the electrostatic charges without a gradual increase in the voltage at node 1.

Figure 7B:
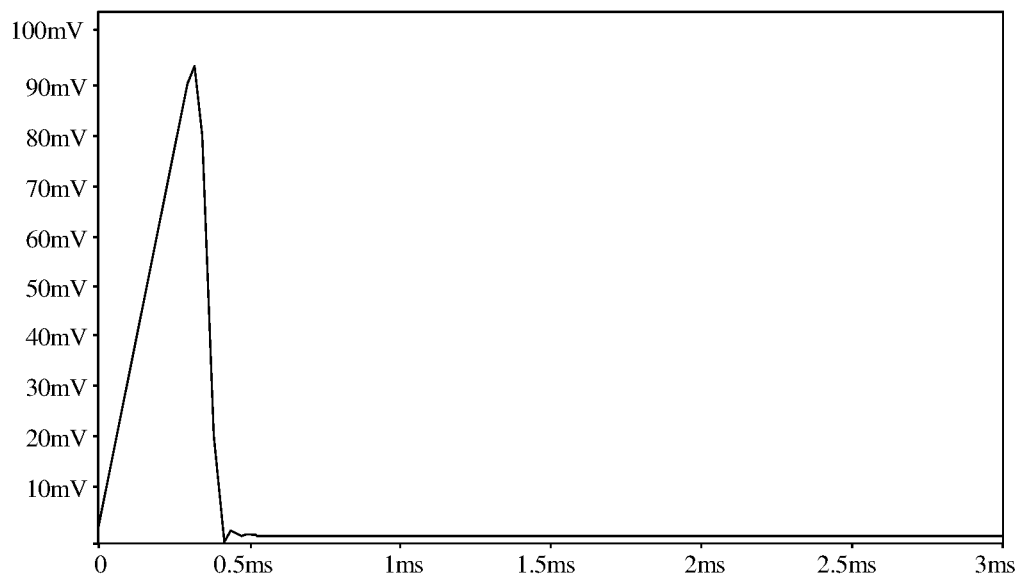
FIG. 7B is a diagram showing a relationship of a voltage at position 8 in the normal state of the circuit shown in FIG. 6E over time according to an embodiment of the present disclosure.

FIG. 7B is a diagram showing a relationship of a voltage at position of a node 8 in the normal state of the circuit shown in FIG. 6E over time. As can be seen that in the normal state, the voltage at the position of the node 8 eventually approaches 0, therefore the turn-off extent of the discharge transistor can be increased.

Figure 7C:
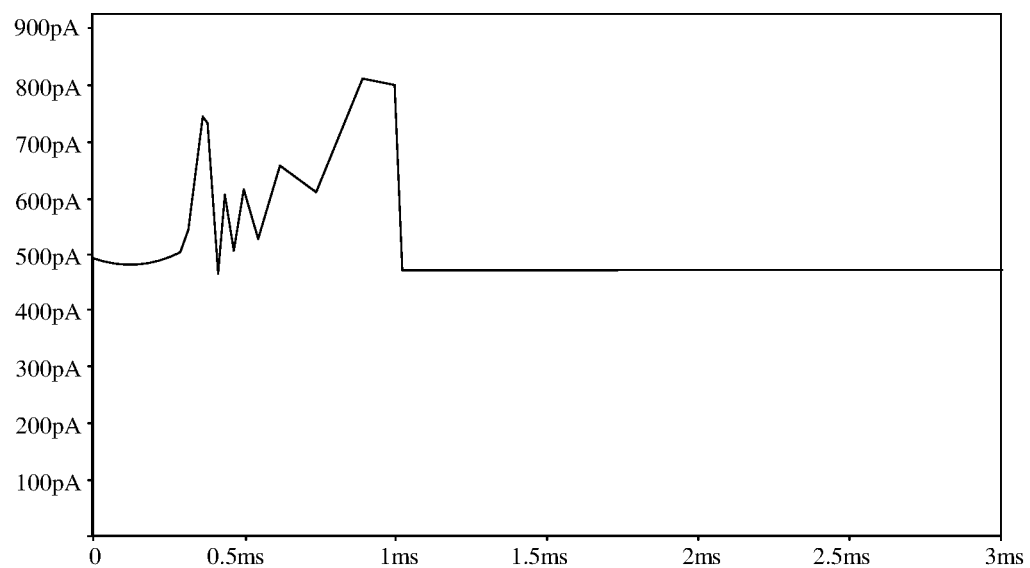
FIG. 7C is a diagram showing a relationship of a discharge leakage current of the discharge transistor in circuit shown in FIG. 6E in the normal state over time according to an embodiment of the present disclosure.

FIG. 7C a diagram showing a relationship of a discharge leakage current of the discharge transistor in circuit shown in FIG. 6E in the normal state over time. As can be seen that the final leakage current of the discharge transistor in the normal state is close to about 480 picoampere (pA), which is very small. Therefore, the circuit shown in FIG. 6E can reduce the leakage current of the discharge transistor.

In the embodiment of the present disclosure, the pull-up unit and the pull-down unit are connected together by combining the fourth inverter and the first inverter into the same one inverter, so that the discharge time is prolonged and the turn-on voltage is reduced, and furthermore, the layout area and leakage current can be reduced.

The above are only exemplary embodiments of the present disclosure and are not intended to limit the scope of protection of the present disclosure.

It is to be noted that, in this disclosure, the terms "includes", "including" or any other variation thereof, are intended to cover a non-exclusive inclusion, such that a process, method, article, or device that includes a list of elements includes not only those elements but also other elements not expressly listed, or also includes elements inherent to such process, method, article, or device. Without more limitations, an element is defined by the statement "including a . . . " that does not rule out there are additional identical elements in a process, method, article, or apparatus that includes the element.

The above-described embodiments of the present disclosure are for the purpose of description only and do not represent the advantages or disadvantages of the embodiments.

The methods disclosed in the method embodiments provided in this disclosure can be arbitrarily combined without conflict to obtain new method embodiments.

The features disclosed in the product embodiments provided in this disclosure can be arbitrarily combined without conflict to obtain new product embodiments.

The features disclosed in the method or apparatus embodiments provided in this disclosure can be arbitrarily combined without conflict to obtain new method embodiments or apparatus embodiments.

The above is only the specific embodiments of the present disclosure, but the scope of protection of the present disclosure is not limited to this. Any person skilled in the technical field who can easily think of change or replacement within the technical scope of the present disclosure shall be covered in the scope of protection of the present disclosure. Therefore, the protection scope of the present disclosure shall be subject to the protection scope of the claims.

INDUSTRIAL APPLICABILITY

Embodiments of the present disclosure provide an electrostatic protection circuit arranged between a power supply pad and a ground pad. The circuit includes: a monitoring circuit configured to generate a trigger signal in response to an electrostatic pulse being present on the power supply pad; a discharge transistor connected between the power supply pad and the ground pad and configured to be turned on under control of the trigger signal and discharge electrostatic discharging charges to the ground pad; and a delay circuit having an input terminal connected to an output terminal of the monitoring circuit, and an output terminal connected to a control terminal of the discharge transistor, where the delay circuit is configured to perform delay processing on the electrostatic protection circuit in a first state and turn off the discharge transistor in a second state. In the first aspect, the monitoring circuit is arranged in the circuit to distinguish normal pulses from electrostatic pulses. In the second aspect, the delay circuit is arranged in the circuit to implement the delay processing of the electrostatic protection circuit in an electrostatic state, so that the discharge time is prolonged, and the turn-on voltage is reduced; and the discharge transistor is controlled to be turned off in the normal state to maintain the voltage on the power supply pad.

The invention claimed is:

1. An electrostatic protection circuit disposed between a power supply pad and a ground pad, the electrostatic protection circuit comprising:
 a monitoring circuit configured to generate a trigger signal in response to an electrostatic pulse being present on the power supply pad;
 a discharge transistor connected between the power supply pad and the ground pad and configured to be turned on under control of the trigger signal and discharge electrostatic discharging charges to the ground pad; and
 a delay circuit having an input terminal connected to an output terminal of the monitoring circuit, and an output terminal connected to a control terminal of the discharge transistor, wherein the delay circuit is configured to perform delay processing on the electrostatic protection circuit in a first state and turn off the discharge transistor in a second state;
 wherein the delay circuit comprises a first delay unit, and wherein the first delay unit is configured to perform the delay processing on the trigger signal in the first state, a resistance-capacitance (RC) time constant for the delay processing is adjustable, an input terminal of the first delay unit is used as the input terminal of the delay circuit, and an output terminal of the first delay unit is coupled to the control terminal of the discharge transistor.

2. The electrostatic protection circuit of claim 1, wherein the monitoring circuit comprises:
a monitoring resistor having a first end connected to the power supply pad; and
a monitoring capacitor having a first end connected to a second end of the monitoring resistor, and a second end connected to the ground pad.

3. The electrostatic protection circuit of claim 1, wherein the delay circuit further comprises a pull-up unit having one end connected to the power supply pad and other end connected to the control terminal of the discharge transistor, and the pull-up unit is configured to turn on, in the first state, the discharge transistor for discharging electrostatic charges.

4. The electrostatic protection circuit of claim 3, wherein the first delay unit comprises an RC circuit, a first level processing unit, and a second level processing unit,
wherein the first level processing unit is configured to perform first level processing on an output voltage of the monitoring circuit to obtain a first voltage in phase with the output voltage of the monitoring circuit;
the RC circuit is configured to perform first delay processing on the output voltage subjected to the first level processing; and
the second level processing unit is configured to perform second level processing on the output voltage subjected to the first delay processing to obtain a second voltage inverted with respect to the output voltage subjected to the first delay processing.

5. The electrostatic protection circuit of claim 4, wherein the delay processing performed by the delay circuit comprises at least one of: second delay processing performed by the first level processing unit on the output voltage of the monitoring circuit; or third delay processing performed by the second level processing unit on the output voltage subjected to the first delay processing.

6. The electrostatic protection circuit of claim 4, wherein the first level processing unit comprises a first inverter and a second inverter sequentially connected to the monitoring circuit, and the second level processing unit comprises a third inverter,
wherein the output terminal of the monitoring circuit is connected to an input terminal of the first inverter, an output terminal of the first inverter is connected to an input terminal of the second inverter, and an output terminal of the second inverter is connected to an input terminal of the RC circuit; and
an output terminal of the RC circuit is connected to an input terminal of the third inverter, and an output terminal of the third inverter is connected to an input terminal of the pull-up unit.

7. The electrostatic protection circuit of claim 4, wherein the RC circuit comprises a second transistor and a first capacitor, the second transistor being a second PMOS transistor,
wherein the second PMOS transistor has a control terminal serving as the input terminal of the RC circuit, a second end connected to the power supply pad, and a third end serving as the output terminal of the RC circuit and respectively connected to a first end of the first capacitor and an input terminal of the second level processing unit; and a second end of the first capacitor is connected to the ground pad.

8. The electrostatic protection circuit of claim 3, wherein the pull-up unit at least comprises a first transistor having a control terminal connected to the output terminal of the first delay unit, a second end connected to the power supply pad, and a third end serving as an output terminal of the pull-up unit and connected to the control terminal of the discharge transistor, wherein the first transistor is configured to turn on, in the first state, the discharge transistor for discharging the electrostatic charges.

9. The electrostatic protection circuit of claim 8, wherein the first transistor is a first Positive-channel Metal-Oxide-Semiconductor (PMOS) transistor.

10. The electrostatic protection circuit of claim 1, wherein the RC time constant of the monitoring circuit has a value of 10 nanoseconds.

11. An electrostatic protection circuit disposed between a power supply pad and a ground pad, the electrostatic protection circuit comprising:
a monitoring circuit configured to generate a trigger signal in response to an electrostatic pulse being present on the power supply pad;
a discharge transistor connected between the power supply pad and the ground pad and configured to be turned on under control of the trigger signal and discharge electrostatic discharging charges to the ground pad; and
a delay circuit having an input terminal connected to an output terminal of the monitoring circuit, and an output terminal connected to a control terminal of the discharge transistor, wherein the delay circuit is configured to perform delay processing on the electrostatic protection circuit in a first state and turn off the discharge transistor in a second state;
wherein the delay circuit further comprises a pull-down unit having an input terminal serving as the input terminal of the delay circuit and an output terminal connected to the control terminal of the discharge transistor, and the pull-down unit is configured to turn off the discharge transistor in the second state.

12. The electrostatic protection circuit for claim 11, wherein the pull-down unit at least comprises a third transistor having a control terminal serving as the input terminal of the delay circuit, a second end connected to the ground pad, and a third end connected to the control terminal of the discharge transistor, and the third transistor is configured to turn off the discharge transistor in the second state.

13. The electrostatic protection circuit of claim 12, wherein:
the pull-down unit further comprises a voltage regulation unit configured to regulate a voltage on the power supply pad, and having an input terminal connected to the output terminal of the monitoring circuit and an output terminal connected to the control terminal of the third transistor.

14. The electrostatic protection circuit of claim 13, wherein the voltage regulation unit comprises a fourth inverter, a fourth transistor and a second capacitor, the fourth transistor being a third PMOS transistor,
wherein an input terminal of the fourth inverter is connected to the output terminal of the monitoring circuit, the control terminal of the third PMOS transistor is connected to an output terminal of the fourth inverter, a second end of the third PMOS transistor is connected to the power supply pad, a third end of the third PMOS transistor is respectively connected to a first end of the second capacitor and the control terminal of the third transistor; and a second end of the second capacitor is connected to the ground pad.

15. The electrostatic protection circuit of claim 12, wherein the third transistor is a first Negative-channel Metal-Oxide-Semiconductor (NMOS) transistor.

* * * * *